(12) United States Patent
Lestan et al.

(10) Patent No.: US 10,124,378 B2
(45) Date of Patent: Nov. 13, 2018

(54) SOIL AND SEDIMENT REMEDIATION

(71) Applicant: ENVIT, Environmental Technologies and Engineering Ltd., Ljubljana (SI)

(72) Inventors: Domen Lestan, Ig (SI); Neza Finzgar, Mirna (SI); Marko Gerl, Ljubljana-Sentvid (SI); Simon Gluhar, Zirovnica (SI); Gorazd Lakovic, Skofljica (SI); Branko Hamiti, Log pri Brezovici (SI)

(73) Assignee: ENVIT, Environmental Technologies and Engineering Ltd., Ljubljana (SI)

( * ) Notice: Subject to any disclaimer, the term of this patent is extended or adjusted under 35 U.S.C. 154(b) by 84 days.

(21) Appl. No.: 15/277,179

(22) Filed: Sep. 27, 2016

(65) Prior Publication Data

US 2017/0100755 A1    Apr. 13, 2017

(30) Foreign Application Priority Data

Oct. 7, 2015    (GB) .................................. 1517757.9

(51) Int. Cl.
*B09C 1/00*    (2006.01)
*B09C 1/02*    (2006.01)
(Continued)

(52) U.S. Cl.
CPC ............... *B09C 1/02* (2013.01); *A62D 3/33* (2013.01); *B01D 11/0288* (2013.01); *B01D 11/0292* (2013.01); *B01J 20/00* (2013.01); *B09C 1/08* (2013.01); *B09C 1/10* (2013.01); *C02F 1/286* (2013.01); *C02F 1/66* (2013.01); *C02F 1/683* (2013.01); *G21F 9/06* (2013.01); *G21F 9/10* (2013.01); *G21F 9/12* (2013.01);
(Continued)

(58) Field of Classification Search
CPC .......... B09B 1/02; A62D 3/33; B01D 11/0292
See application file for complete search history.

(56) References Cited

FOREIGN PATENT DOCUMENTS

| | | |
|---|---|---|
| CN | 104624163 A | 5/2015 |
| GB | 2 338 476 A | 12/1999 |

(Continued)

OTHER PUBLICATIONS

Almaroai et al., "Role of chelating agents on release kinetics of metals and their uptake by maize from chromated copper arsenate-contaminated soil", Environ. Technology, vol. 34, 2013, pp. 747-755. (Cited in IDS filed on Sep. 27, 2016).

(Continued)

*Primary Examiner* — John J Kreck
(74) *Attorney, Agent, or Firm* — Renner, Otto, Boisselle & Sklar, LLP (57) ABSTRACT

A batch process of remediation of soil and sediment contaminated with toxic metals includes the steps of treating contaminated soil and sediment with a solution containing aminopolycarboxylic chelating agent, rinsing the soil/sediment solid phase to remove residues of mobilized toxic metals, treating the used process waters to recycle chelating agent and clean process solutions and placing the remediated soil/sediment on a permeable horizontal reactive barrier to prevent emission of contaminants. In the batch process, toxic metals are removed from process solutions by alkaline adsorption of polysaccharide adsorbents. By applying alkaline adsorption the efficiency of toxic metal removal from process solutions and alkaline and acidic recycling of chelating agent is significantly improved.

12 Claims, 11 Drawing Sheets

(51) Int. Cl.

| | |
|---|---|
| *A62D 3/33* | (2007.01) |
| *B09C 1/08* | (2006.01) |
| *G21F 9/06* | (2006.01) |
| *G21F 9/10* | (2006.01) |
| *G21F 9/12* | (2006.01) |
| *B01J 20/00* | (2006.01) |
| *B01D 11/02* | (2006.01) |
| *B09C 1/10* | (2006.01) |
| *C02F 1/28* | (2006.01) |
| *C02F 1/66* | (2006.01) |
| *C02F 1/68* | (2006.01) |
| *A62D 101/24* | (2007.01) |
| *C02F 101/20* | (2006.01) |

(52) U.S. Cl.
CPC ...... *A62D 2101/24* (2013.01); *C02F 2101/20* (2013.01); *C02F 2303/18* (2013.01)

(56) References Cited

FOREIGN PATENT DOCUMENTS

| SI | 21358 A | 6/2004 |
|---|---|---|
| WO | 2012/173576 A2 | 12/2012 |

OTHER PUBLICATIONS

Zeng et al., "Recycling EDTA solutions used to remediate metal-polluted soils", Environ. Pollution, vol. 133, 2005, pp. 225-231. (Cited in IDS filed on Sep. 27, 2016).

Ager et al., "The removal of metals and release of EDTA from pulp wash water", J. Wood Sci. Technology, vol. 21, 2001, pp. 413-425. (Cited in IDS filed on Sep. 27, 2016).

Juang et al., "Electrolytic recovery of binary metals and EDTA from strong complexed solutions", Water Research, vol. 34, 2000, pp. 3179-3185. (Cited in IDS filed on Sep. 27, 2016).

Pociecha et al., "Electrochemical EDTA recycling with sacrificial Al anode for remediation of Pb contaminated soil", Environ. Pollution, vol. 158, 2010, pp. 2710-2715. (Cited in IDS filed on Sep. 27, 2016).

Di Palma et al., "Recovery of EDTA and metal precipitation from soil washing solutions", J. Hazardous Materials. vol. 103, 2003, pp. 153-168. (Cited in IDS filed on Sep. 27, 2016).

Almaroai et al., "Role of chelating agents on release kinetics of metals and their uptake by maize from chromated copper arsenate-contaminated soil", Environ. Technology, vol. 34, 2013, pp. 747-755.

Zeng et al., "Recycling EDTA solutions used to remediate metal-polluted soils", Environ. Pollution, vol. 133, 2005, pp. 225-231.

Ager et al., "The removal of metals and release of EDTA from pulp wash water", J. Wood Sci. Technology, vol. 21, 2001, pp. 413-425.

Juang et al., "Electrolytic recovery of binary metals and EDTA from strong complexed solutions", Water Research, vol. 34, 2000, pp. 3179-3185.

Pociecha et al., "Electrochemical EDTA recycling with sacrificial Al anode for remediation of Pb contaminated soil", Environ. Pollution, vol. 158, 2010, pp. 2710-2715.

Di Palma et al., "Recovery of EDTA and metal precipitation from soil washing solutions", J. Hazardous Materials. vol. 103, 2003, pp. 153-168.

Search Report for corresponding GB Application No. 1517757.9 dated Mar. 1, 2016.

Hasegawa et al., "Recovery of toxic metal ions from washing effluent containing excess aminopolycarboxylate chelant in solution", Water Research, vol. 45, 2011, pp. 4844-4854.

Extended European Search Report received in corresponding EP Application No. 16188935.7 dated Feb. 8, 2017.

O'Connell et al., "Heavy metal absorbents prepared from the modification of cellulose: A review", Bioresource Technology, vol. 99, No. 15, Oct. 1, 2008, pp. 6709-6724.

Gregorio, "Recent Developments in Polysaccharide Based Materials Used as Absorbents in Waste Water Treatment". Progress in Polymer Science, vol. 30, No. 1, Jan. 1, 2005, pp. 38-70.

SOIL AND SEDIMENT REMEDIATION

The present invention relates to a batch process of remediation of soil and sediment contaminated with toxic metals. The process may comprise the steps of treating contaminated soil and sediment with the solution containing aminopolycarboxylic chelating agent such as ethylenediaminetetraacetate (EDTA), rinsing the soil/sediment solid phase to remove residues of mobilized toxic metals, treating the used process waters to recycle chelating agent and clean process solutions and placing the remediated soil/sediment on permeable horizontal reactive barrier to prevent emission of contaminants.

The process described in the invention "Soil and sediment remediation" includes the processes described in patent application "Washing of contaminated soils", International Application Number PCT/SI2012/000039.

CURRENT PROCESSES FOR REMEDIATION OF SOILS AND SEDIMENTS CONTAMINATED WITH TOXIC METALS USING EDTA

The main sources of soil and sediment contamination with toxic metals, such as lead (Pb), copper (Cu), zinc (Zn), cadmium (Cd), mercury (Hg), nickel (Ni), molybdenum (Mo), thallium (Tl) and chromium, and metallic radionuclides such as uranium (U), caesium (Cs) and strontium (Sr) are industrial and traffic emissions, the use of phytopharmaceuticals, mineral and organic fertilizers in farming and accident spills. In contrast to organic pollutants, toxic metals persist in the environment, while radionuclides decay very slowly.

The selection of appropriate technology for remediation of soils and sediments contaminated with toxic metals depends on the contamination source and history and soil type and on the final use of the reclaimed land.

Soil washing and leaching with an aqueous solution of chelating agents is considered to be a remedial option with a potentially low impact on soil quality. Chelating agents applied to the soil/sediment form water soluble coordinative complexes (chelates) with toxic metals and metallic radionuclides and in this way transfer metals and metallic radionuclides from the soil solid to the aqueous soil phase, which can then be removed from the soil/sediment. The best known and most frequent synthetically produced chelant used for washing/leaching soils and sediments is ethylenediamine tetraacetate (EDTA) although other aminopolycarboxylic chelating agents such are nitrilotriacetate (NTA), diethylenetriamine pentaacetate (DTPA), ethylenediamine-N,N'-bis (2-hydroxyphenylacetate) (EDDHA), ethylene glycol tetraacetate (EGTA) with similar chemical structure and chelating properties were also tested. Toxic metals can be EDTA-extracted from soil and sediment because the reported ordering of EDTA chelate stability constants: $Na^+<Mg^{2+}<Ca^{2+}<Fe^{2+}<Al^{3+}<Zn^{2+}<Cd^{2+}<Pb^{2+}<Ni^{2+}<Cu^{2+}<Hg^{2+}<Fe^{3+}$ favours the removal of toxic metal contaminants over natural hardness ions (Y. A. Almaroai, A. R. Usman, M. Ahmad, K. R. Kim, M. Vithanage, Y. S. Ok, Role of chelating agents on release kinetics of metals and their uptake by maize from chromated copper arsenate-contaminated soil, Environ. Technol. 34 (2013), pp. 747-755).

Although EDTA is not a particularly expensive chemical, the cost of chelating agent use can be significant, since low EDTA concentrations often do not extract toxic metals from soil effectively. Processes are known of how to recycle spent EDTA from the used washing solution. Toxic metals can be separated from EDTA with $Na_2S$ under alkaline conditions, resulting in almost a complete recovery of metals through precipitation in the form of insoluble metal sulphides (Q. R. Zeng, S. Sauve, H. E. Allen, and W. H. Hendershot, Recycling EDTA solutions used to remediate metal-polluted soils, Environ. Pollut. 133 (2005), pp. 225-231). Zero-valent bimetallic mixtures ($Mg^0$—$Pd^0$, $Mg^0$—$Ag^0$ can also be used to precipitate toxic metals from the solution, while liberating EDTA in alkaline pH (P. Ager, and W. D. Marshall, The removal of metals and release of EDTA from pulp wash water, J. Wood Sci. Technol. 21 (2001), pp. 413-425). Electrolytic recovery of toxic metals and EDTA from used washing solution in a two-chamber electrolytic cell separated with a cation exchange membrane to prevent EDTA anodic oxidation has been reported (R. S. Juang, and S. W. Wang, Electrolytic recovery of binary metals and EDTA from strong complexed solutions, Water Res. 34 (2000), pp. 3179-3185). In another electrochemical process, toxic metals and EDTA are separated in an electrolytic cell under alkaline conditions using a sacrificial Al anode. Al substitutes the toxic metals in complex with EDTA and the released metals are removed by electro-precipitation/coagulation (M. Pociecha, and D. Lestan, Electrochemical EDTA recycling with sacrificial Al anode for remediation of Pb contaminated soil, Environ. Pollut. 158 (2010), pp. 2710-2715). EDTA can also be recycled by substituting toxic metals with $Fe^{3+}$ under acidic conditions, followed by the precipitation of the released metals with phosphate at near neutral pH. $Fe^{3+}$ ions are then precipitated as hydroxides at high pH using NaOH, thus liberating the EDTA (L. Di Palma, P. Ferrantelli, C. Merli, and F. Biancifiori, Recovery of EDTA and metal precipitation from soil washing solutions, J. Hazard. Mater. 103 (2003), pp. 153-168).

Current Process of Recycling Chelating Agent and Process Waters after Soil Washing Mobilization of toxic metals in soil/sediment by the formation of water-soluble chelates of EDTA and toxic metals poses a threat to the environment. Therefore the EDTA-washed/leached soil/sediment must be thoroughly rinsed to remove mobilized toxic metal species before remediated soil/sediment is returned to the site of excavation or deposited elsewhere. In addition to EDTA recycling, the generation of large amounts of wastewater after soil/sediment washing/leaching, which needs treatment before safe disposal, has long remained an unsolved problem. The economics of soil/sediment remediation processes therefore requires both chelating agent and process water recycling.

Patent application "Washing of contaminated soils", International Application Number PCT/SI2012/000039 by the same proprietor as the present proprietor describes a soil/sediment remediation process wherein EDTA and process water are recycled and which is similar to the process described in our invention. The known process and the process described in our invention share the alkaline precipitation in which toxic metals are separated from the used washing solution as insoluble hydroxides after they are substituted with Ca in the chelate with EDTA, and the precipitation of protonated EDTA in acidic media. Both processes are characterised by very low requirements for fresh water and no emissions of waste waters. Both processes share the advantage of using $H_2SO_4$ in the acidic part of the process in the combination of using Ca-containing base ($Ca(OH)_2$, CaO, lime, quicklime or mixture of thereof) in the alkaline part of the process. Excess $SO_4^{2-}$ and $Ca^{2+}$ form insoluble calcium sulphate salt ($CaSO_4$), which precipitates and is removed from the process solution. In this way, the build-up of salty ions through several batches of soil/sediment remediation is prevented. The main characteristics that distinguish the process according to our invention from the known process are:

a. In known process significant part of chelating agent remains in the process water (is not recycled) and is removed by the oxidative degradation using advanced oxidation processes, such are combination of ozonation and UV irradiation and electrochemical processes. Toxic metals released from degraded chelating agent are than removed by (electro)precipitation. The oxidative degradation of chelating agent in the known process is time consuming, costly, difficult to control and results in lost of chelating agent from the process.

b. In the process described in our invention in addition to alkaline precipitation of toxic metals hydroxides, toxic metals are removed from process solutions also by alkaline adsorption of polysaccharide adsorbents. By applying alkaline adsorption the efficiency of toxic metal removal from process solutions and alkaline and acidic recycling of chelating agent, i.e. EDTA, is significantly improved. Since the novel process is highly effective, further cleansing of process waters with advanced oxidation processes are not needed.

c. In known process the Ca-containing base is used only once and than discharged as a waste material. In the process described in our invention the $Ca(OH)_2$ generated in the alkaline part of the process is reused several times through a series of alkalinisations. Likewise the polysaccharide adsorbent is reused in a series of alkalinisation of process solutions with increasing content of chelating agent and toxic metals. By this innovative way the consumption of fresh Ca-containing base and polysaccharide adsorbent and the production of waste material is significantly reduced.

After remediation the mobilized toxic metal species are in low concentrations still present in remediated soil/sediment. The known process is silent about toxic metal emissions from remediated soil/sediment. In the process described in our invention permeable horizontal permeable reactive barrier may be placed below the mass of remediated material to prevent emissions of toxic metals to the subsurface and groundwater. The horizontal permeable reactive barriers are known from the patent SI 21358 A (2004). The main characteristics that distinguish the process according to our invention from known process are:

a. In known process the permeable horizontal reactive barrier is used to prevent emissions of toxic metals from easily biodegradable chelating agent [S,S]-stereoisomer of ethylenediamine disuccinate. (S,S-EDDS). In the present invention the said barrier is used to prevent emissions of toxic metals from biologically resistant chelating agent (i.e. EDTA).

b. In known process the permeable horizontal reactive barrier is composed of nutrients to induce microbial activity for biodegradation of S,S-EDDS and absorbents to immobilize the released toxic metals. In the present invention the said reactive barrier is composed of Ca-containing base which releases toxic metals from chelating agent (i.e. EDTA) and leaves toxic metal hydroxides immobilised within the said barrier.

INTRODUCTIONARY OUTLINE OF A PROCESS ACCORDING TO AN EMBODIMENT

A batch process for remediation of soils/sediments contaminated with toxic metals in a series of batch processes, said batch process comprising the following steps:

(a) Washing or leaching a solid phase of contaminated soil/sediment with washing solution, said washing solution comprising EDTA or other chelating agent from the group of aminopolycarboxylic acids, their salts and mixtures of thereof and auxiliary chemical and physical enhancers of toxic metal extraction, known to one skilled in art.

(b) Separating the washing solution from the solid phase to obtain a washed solid phase and used washing solution.

(c) Rinsing of the washed solid phase with one or several rinsing solutions and possibly with fresh water to compensate for water loss from the solid phase during the process according to invention. Typically but not exclusively fresh water is used for the final rinsing.

(d) Subsequent separation of said rinsing solutions to obtain a rinsed solid phase and one or several used rinsing solutions.

(e) Alkalinisation of the used process solutions obtained in steps (b) and (d) to value between pH 11.5 and pH 13.5 using calcium containing base and other alkaline materials as auxiliary bases, thereby precipitating mixture comprising used $Ca(OH)_2$ and toxic metal hydroxides.

(f) Supplement of natural polysaccharide materials or their or artificial chemical derivates or their structural analogues or mixtures of thereof to process solutions treated in step (e) for alkaline adsorption of toxic metals.

(g) Subsequent separation of the precipitated mixture of used $Ca(OH)_2$ and metal hydroxides and polysaccharide material with adsorbed toxic metals from the used washing and rinsing solutions.

(h) Acidification of the used process solutions of step (g) containing chelating agent to the value between pH 3 and pH 1.5 using $H_2SO_4$ and other auxiliary mineral and organic acids thereby precipitating chelating agent. Typically but not exclusively used rinsing solutions with more than 5 mM of chelating agent are treated by acidification. Typically but not exclusively used washing solution is not treated by acidification.

(i) Subsequent separation of the precipitated chelating agent from acidified solutions of step (h).

(j) Re-using of the rinsing solutions recycled in step (g) and step (i) for rinsing the solid phase in the subsequent batch process in said series of batch processes. The pH of rinsing solutions can be adjusted to values between pH 2.0 and 12. Rinsing solutions can be supplied with auxiliary materials known to one skilled in art to improve washing/rinsing process (i.e. surfactants).

(k) Addition of chelating agent separated in step (i) and of the fresh chelating agent or mixture of thereof to the used washing solution of the step (g), thereby recycling the washing solution with chelating agent concentration between 10 and 250 mol per ton of soil/sediment processed, to be used in step (a) of the subsequent batch process in said series of batch processes. The pH of washing solution can be adjusted to value between 3.0 and 9.0. Auxiliary chemical and physical enhancers of toxic metal extraction, known to one skilled in art, can be applied.

(l) The rinsed solid phase of the step (c) can be formulated with one or more additives selected from the group consisting of soil fertilizers, soil conditioners, toxic metals immobilizators and microbial inoculants to obtain the remediated soil/sediment.

(m) Deposition of the remediated soil/sediment on permeable horizontal reactive barrier containing calcium-containing base as a reactive material and adsorbents selected from polysaccharides, aluminium and iron oxides and anion exchange resins as auxiliary reactive materials. The permeable horizontal reactive barrier uses the mechanism of alkaline precipitation of step (e) and alkaline adsorption of step (f) to remove toxic metals from soil leachate.

DESCRIPTION OF THE PREFERRED EMBODIMENT OF THE INVENTION

The process described in our invention is a batch process for remediation of soils and sediments contaminated with toxic metals, wherein the toxic metals are selected from the group consisting of Pb, Zn, Cd, Cu, Hg, Ni, Mo, Tl, Cr, U, Cs, Sr. The process described in our invention also enables cleansing of the contaminated fraction of fines (mostly composed of humic substances, other organic matter, clays and silts) obtained after physical separation of fines from the less contaminated bulk of the soil and sediment using hydrocyclons or flotation. The process is also suitable for remediation of fertile and nutrient rich contaminated garden soils. The process equipment; i.e. wet screens, trammel screens, sieves, reactors, vessels, columns, heap systems, filter presses, filtration systems and other liquid/solid separators, storage tanks, pumps, transporters and other devices with which one skilled in the art would be familiar are used in our innovation.

Preparation of Soil/Sediment for Remediation

Soils and sediments are excavated from the contaminated site, transported to the remediation plant, treated, and after remediation returned to the original site, deposited elsewhere, or disposed of in another way. Compact materials such as stones and other process oversizes can be separated from the contaminated soil/sediment before or during the process using sieving and other methods known to one skilled in the art. In some embodiment of the innovation the over-sizes are cleansed with process waters. Cleansed oversizes can be mixed with remediated and formulated soil/sediment, returned to the original site, deposited elsewhere, or disposed of in another way. Semi-metals (i.e. As) and organic co-contaminants which could be present in the soil/sediment are removed/detoxified before or after remediation by the process described in our invention using thermal desorption, chemical degradation and transformations, biodegradation and biotransformations, phytoremediation, washing/leaching with solvents, immobilization and by other conventional methods known to one skilled in the art.

Washing and Rinsing the Contaminated Solid Phase

Figure 1:
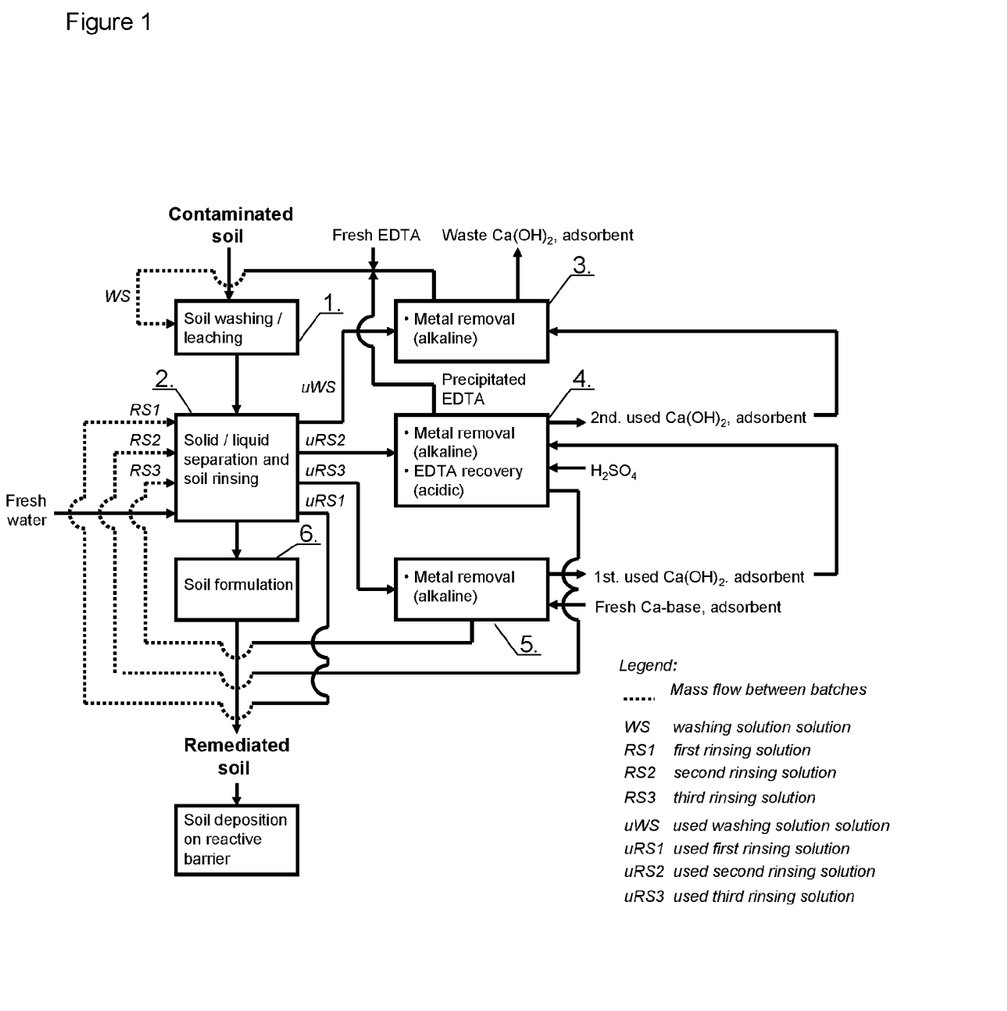
FIG. 1. Flowchart of the preferred embodiment of the process according to the invention "Soil and sediment remediation".

Soils and sediments (and their highly contaminated fractions) are washed in mixing vessel for 0.5-48 hours or leached within heap or column for 1 hour-30 days with solution containing chelating agent selected from the group of aminopolycarboxylic acids and their salts and mixtures of thereof, preferably but not limited to EDTA (further on referred as washing solution), in a series of batch processes (FIG. 1, 1). The volume ratio between the soil/sediment solid phase and the washing solution can vary between 1:0.5 and 1:3. In the first batch in a series of batch processes the washing solution is prepared by dissolving the fresh chelating agent (further on referred also as EDTA) in the protonated form or in the form of Na, Ca or other salts) in the fresh water. In the subsequent batches the washing solution is prepared by dissolving the recycled protonated EDTA ($H_4EDTA$) in the treated (alkalinised) used washing solution (uWS in FIG. 1) which contains EDTA recycled as Ca chelate (e.g. Ca-EDTA complex). If necessary, the fresh EDTA (FIG. 1) is added to compensate for the chelating agent which is lost during the process (incorporated in remediated soil/sediment and in waste materials). The final concentration of EDTA in the washing solution ranges from 10 to 250 mmol of chelant per kg of air-dried soil/sediment. To increase the efficiency of the washing/leaching process, the pH of the washing solution can be adjusted to pH value between 3.0 and 9.0. The washing solution can also be amended with supporting compounds selected from, but not limited to: surfactants, emulgators, detergents and exchangeable ions with which one skilled in the art would be familiar to enhance the extraction of toxic metals from contaminated soils/sediments.

After washing/leaching of the soil/sediment (FIG. 1, 1) the solid phase is separated from the used washing solutions (uWS) in the filter press, within the heap or column, or by other solid/liquid separation method known to one skilled in the art (FIG. 1, 2). The uWS is treated by alkalinisation (FIG. 1, 3) and recycled as described bellow. After separation the washed solid phase is not completely dry and contains pore-solution with toxic metals dissolved as EDTA chelates (complexes). These chelated toxic metals are removed by rinsing the washed solid phase once or several times. For this to achieve the washed solid phase within the filter press, in the heap, column or in the reactor is rinsed with the process water which is generated and treated (and in this way recycled) in the previous batches in a series of batch processes. The used rinsing solutions are treated by alkalinisation to remove toxic metals and by acidification to recycle EDTA in protonated ($H_4EDTA$) form.

In the preferred embodiment of the invention the washed solid phase is rinsed with first, second and third rinsing solution and at the end with the fresh water (FIG. 1, 2). The first rinsing solution (RS1 in FIG. 1) in the current batch is the same solution as the rinsing solution which was the last separated from the solid phase in the previous batch (uRS1 in FIG. 1). This solution contains low concentration of toxic metals and EDTA. In the preferred embodiment of the invention it is therefore not treated and is as RS1 used as such (FIG. 1). The used second rinsing solution (uRS2 in FIG. 1) is separated from the soil phase after used washing solution (uWS, FIG. 1). uRS2 is treated by alkalinisation and acidification (FIG. 1, 4) as described below and recycled as the second rinsing solution (RS2 in FIG. 1). RS2 is used for rinsing in a subsequent batch. The used third rinsing solution (uRS3 in FIG. 1) is separated from the solid phase after uRS2 (FIG. 1, 2). uRS3 is in the preferred embodiment of the invention treated by alkalinisation (FIG. 1, 5) as described bellow and recycled as the third rinsing solution (RS3 in FIG. 1). RS3 is used for rinsing in a subsequent batch. The volume ratio of the washed solid phase and each of the rinsing solutions ranges from 1:0.5 to 1:3. The volume of fresh water for the final rinsing of the washed solid phase (FIG. 1, 2) is defined by the water loss during the process. Most water is lost as moisture in remediated soil/sediment exiting the process which is higher than the moisture in contaminated soil/sediment entering the process, and with moist waste materials ($Ca(OH)_2$ and polysaccharide adsorbent as described bellow).

The pH of RS2 and RS3 can be adjusted for soil/sediment rinsing to values between pH 2 and 12. Rinsing solutions can be supplied with auxiliary materials known to one skilled in art to improve washing/rinsing process (i.e. surfactants).

Treatment and Recycle of Used Washing and Rinsing Solutions

Figure 2:
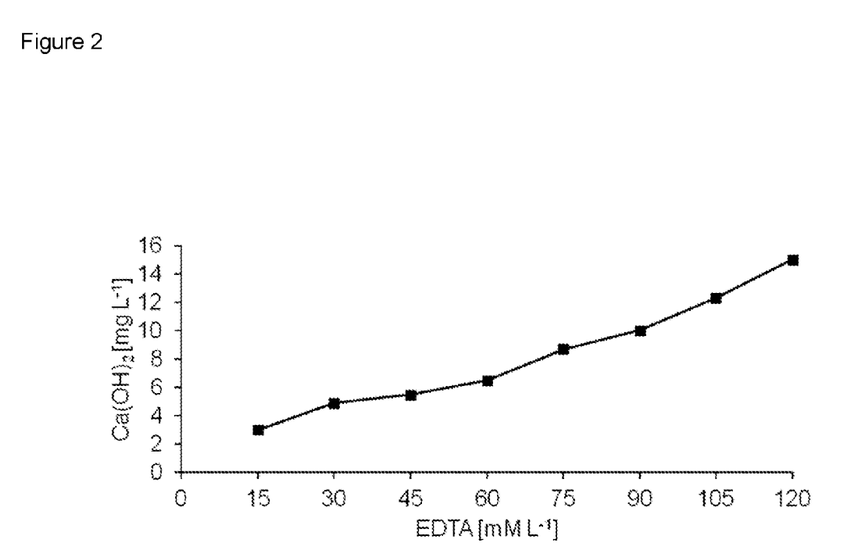
FIG. 2. Alkalinisation of solutions with different concentration of EDTA with $Ca(OH)_2$ to pH 12.5. Increasing amounts of lime are needed due to pH buffering capacity of chelating agent.
Figure 3:
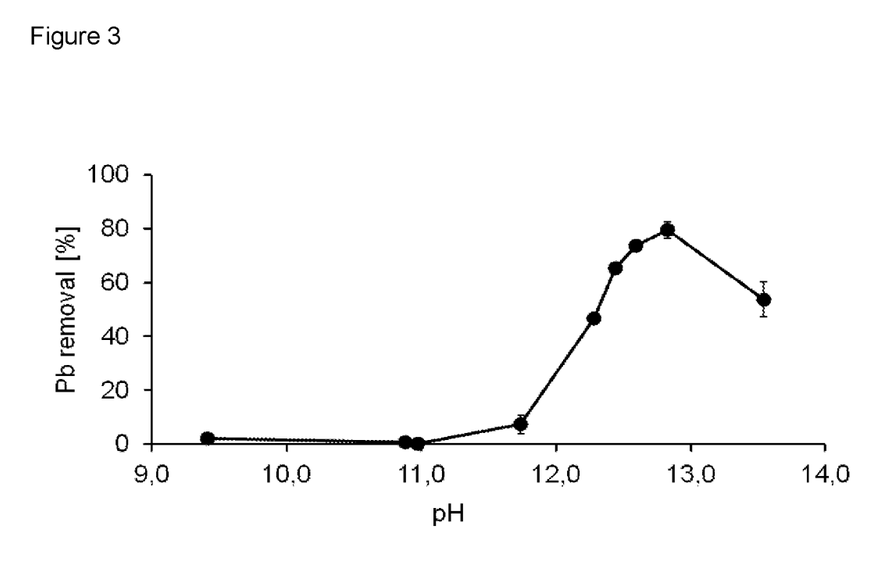
FIG. 3. Removal of Pb from the used process solution by alkaline precipitation and by alkaline adsorption on polysaccharide material at different pH. Used process solution contained 12 mM EDTA and 233 mg $L^{-1}$ Pb. The pH of the process solution was adjusted by addition of $Ca(OH)_2$ from 9.5 to 12.8 and afterwards by addition of NaOH. As a polysaccharide absorbent 4 g $L^{-1}$ of waste paper was used.
Figure 4:
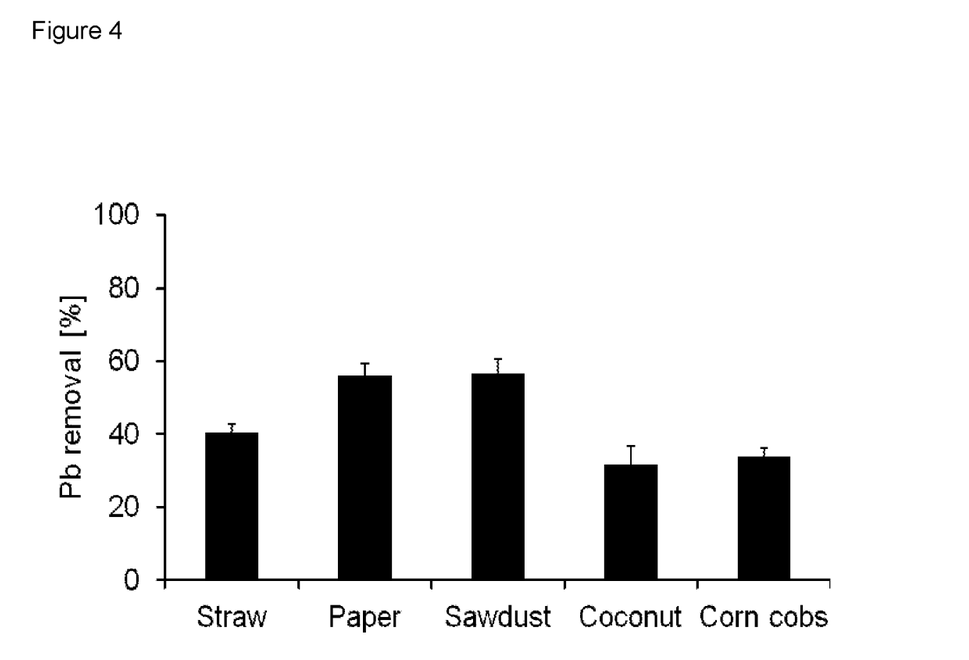
FIG. 4. Removal of Pb from the used process solution by alkaline adsorption on different polysaccharide materials at pH 12.5. After initial substitution of Pb in the EDTA chelate with Ca from Ca containing base and removal of precipitated Pb the process solution contained 12 mM EDTA and 40 mg of Pb.
Figure 5:
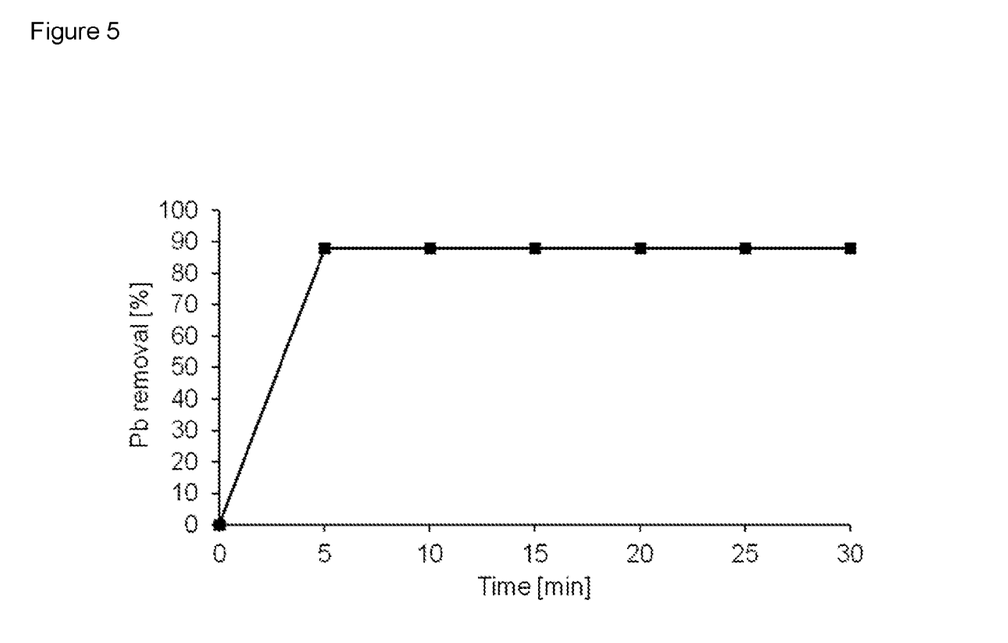
FIG. 5. The dynamic of alkaline (pH 12.3) adsorption of Pb on recycled paper after alkaline substitution of Pb in the EDTA chelate with Ca from Ca containing base.

The used process solutions (uWS, uRS2 and uRS3) except used first rinsing solution (uRS1) are in the preferred embodiment of the invention treated by alkalinisation to pH between 11.5 and 13.5, imposed by addition of Ca-containing base. The amount of base for alkalinisation is governed by the buffering capacity of process solution, primarily by the concentration of chelating agent (FIG. 2). The alkalinity destabilises EDTA chelates with toxic metals (complexes). Consequently, toxic metals are substituted in the EDTA chelate by Ca (e.g., Ca-EDTA). The Ca-containing bases are poorly water-soluble and are supplied in (stechiometrically) excessive quantities to promote the shift of chemical equilibrium of the alkaline substitution reaction towards Ca-EDTA formation. Addition of polysaccharide material into alkalinised process solution further shifts the chemical equilibrium of alkaline substitution reaction towards formation of Ca-EDTA due to alkaline adsorption reaction and additional removal of toxic metals from solution (and reaction). The removal of toxic metal (e.g. Pb) from the used process solution by alkaline precipitation and by alkaline adsorption on polysaccharide material (e.g. waste paper) as a function of pH is depicted in FIG. 3. Polysaccharide adsorbents are selected from natural and artificial materials containing cellulose, hemicellulose, lignocellulose, cellulose-acetate, cellulose nitrate, viscose, their chemical derivates and structural analogues. The efficiency of various natural polysaccharides for alkaline adsorption of toxic metals is shown in FIG. 4. The contact time required for toxic metals adsorption on waster paper is shown in FIG. 5. Typically, 1-8 kg of polysaccharide material (dry weight) is added per m3 of process solution for alkaline adsorption of EDTA-exchanged toxic metals. After removal of toxic metals the chelating agent is recycled and remains in process solution (uWS and uRS2) in an active Ca-EDTA form. Concentration of Ca-EDTA in used third rinsing solution (uRS3) is usually very low. Therefore chelating agent is usually not recycled from uRS3 and reused in WS for soil/sediment washing/leaching.

Figure 6:
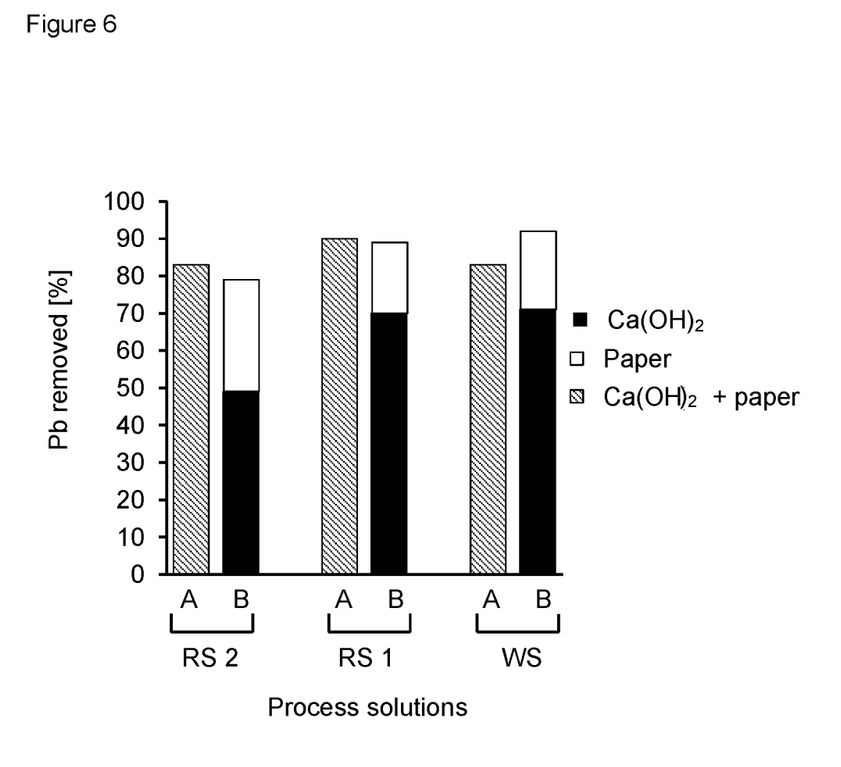
FIG. 6. Removal of Pb from the used third (uRS3) and second rinsing (uRS2) and from used washing solution (uWS) by (A) single process of simultaneous substitution and adsorption and (B) by two separate processes of first alkaline substitution and subsequent alkaline adsorption. 3 kg $m^{-3}$ of fresh $Ca(OH)_2$ was supplied to uRS3. Used $Ca(OH)_2$ from uRS3 was amended with 2 kg of fresh $Ca(OH)_2$ and supplied to uRS2. Used $Ca(OH)_2$ from uRS2 was amended with additional 2 kg of fresh $Ca(OH)_2$ and supplied to uWS. 5 kg $m^{-3}$ of paper was supplied to uRS3 and re-used for alkaline adsorption in uRS2 and than in uWS.

In one of the embodiments of the invention toxic metals are removed from the process solutions (uWS, uRS2 and uRS3) by separate processes of alkaline substitution and alkaline adsorption. In alkaline substitution (5-120 minute reaction at pH 11.5-13.5) hydroxides of toxic metals precipitate in mixture with the exceeding quantity of Ca-containing base (precipitated as $Ca(OH)_2$). After separation of mixture of $Ca(OH)_2$ and toxic metals polysaccharide material is added in the process solution in a successive process. A short contact time is required for alkaline adsorption before separation of polysaccharide material with adsorbed toxic metals (FIG. 5). In another embodiment of the invention alkaline substitution an alkaline adsorption are performed simultaneously in a single process (5-120 minute reaction at pH 11.5-13.5). The Pb removal efficiency of both embodiments of the invention is similar (FIG. 6). The precipitate comprising $Ca(OH)_2$ and toxic metal hydroxides and the polysaccharide material with adsorbed toxic metals are separated from the process solution by filtration, centrifugation sedimentation and other liquid-solid separation methods known to one familiar with art.

Figure 7:
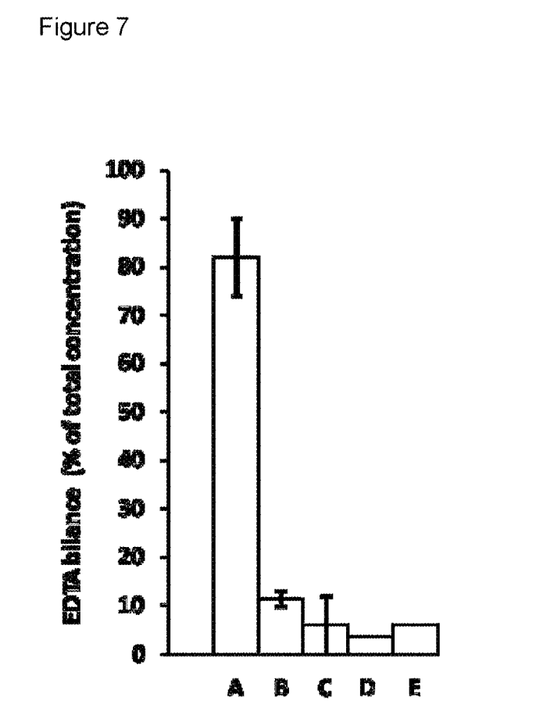
FIG. 7. EDTA balance (percentage of the total EDTA input in the process): chelant recycled from the used washing (A) and second rinsing solution (B), chelant lost from the process due to the soil binding (C), chelant lost from the process with wastes (D), fresh EDTA supplied to the process (E). Average EDTA concentrations from 8 remediation batches using contaminated soil from Mezica, Slovenia, were used in EDTA balance calculation.

After toxic metals removal by alkaline substitution and adsorption the second used rinsing solution (uRS2) contains (beside uWS) significant amount of chelating agent (e.g. Ca-EDTA). To recover chelating agent the uRS2 is acidified to pH between pH 3.0 and 1.5 using $H_2SO_4$ (FIG. 1, 4). After 15-120 minute reaction the insoluble protonated chelating agent (e.g. $H_4EDTA$) precipitates. $H_4EDTA$ is another active form of recycled chelating agent. It is removed from uRS2 by filtration, sedimentation or other liquid-solid separation methods with which one skilled in the art would be familiar. After $H_4EDTA$ separation the uRS2 is recycled to RS2 to be used for solid phase rinsing in the next batch in series of batches (FIG. 1, 2). The $H_4EDTA$ recovered from uRS2 is added to the used washing solution (uWS) which already contains chelating agent in the active Ca-EDTA form (FIG. 1, 3). Fresh EDTA is supplied to compensate loses of chelating agent during the process to yield the final total concentration of chelating agent ranging from 10-250 mmol $kg^{-1}$, as described above. The balance of chelating agent during the remediation process according to invention (EDTA inputs, outputs, recycle and loss) is shown in FIG. 7. After possible pH adjustment (as described above) the uWS becomes recycled washing solution (WS) and is used for soil/sediment washing/leaching in the next batch in series of batches (FIG. 1, 1)

Figure 8:
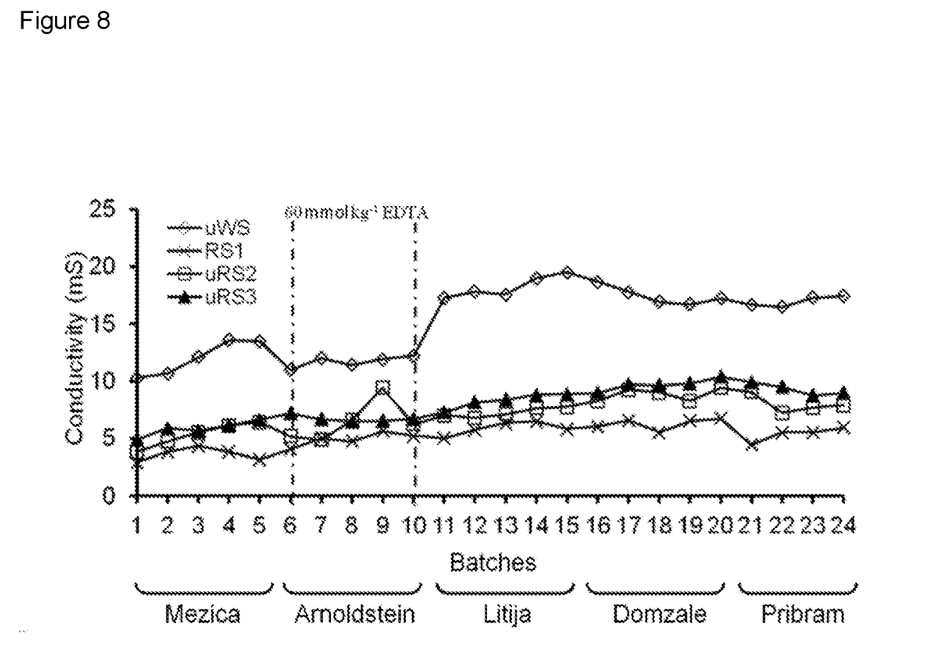
FIG. 8. Conductivity of the used washing (uWS), first (uRS1), second (uRS2) and third rinsing solution (uRS3) during the course of 24 consecutive remediation batches using soils from former Pb smelter sites in Mezica, Litija, Domzale in Slovenia, Arnoldstein in Austria and Pribram in Czech Republic.

Excess $SO_4^{2-}$ from acidic and $Ca^{2+}$ from alkaline part of the process form insoluble calcium sulphate salt ($CaSO_4$), which precipitates and is removed from the process solutions in solid-liquid separation step (FIG. 1, 2). In this way, the build-up of salty ions in process solutions (measured as conductivity) through consecutive batches of soil/sediment remediation is prevented as shown in FIG. 8.

Re-Use of $Ca(OH)_2$ and Polysaccharide Adsorbent

In the process according to invention the mixture of used $Ca(OH)_2$ and toxic metal hydroxides and the used polysaccharide material with adsorbed toxic metals are separated from the given process solution are re-used for toxic metal removal by alkaline substitution and adsorption from the process solution which is series of batch processes separated from the solid phase before the given process solution.

In the preferred embodiment of the invention the used third rinsing solution (uRS3) is alkalinised with fresh Ca-containing base ($Ca(OH)_2$, CaO, lime, quicklime or mixture of thereof) to precipitate metal hydroxides and with fresh polysaccharide material to adsorb EDTA-exchanged toxic metals (FIG. 1, 5). The precipitated mixture of lime $Ca(OH)_2$ and metal hydroxides and used polysaccharide material with adsorbed toxic metals are separated from uRS3 and used for toxic metal removal (by alkaline substitution and adsorption) from the second used rinsing solution (uRS2) (FIG. 1, 4). After separation from uRS2 lime and polysaccharide material are re-used for the third time for toxic metal removal (by alkaline substitution and adsorption) from the used washing solution (uWS). After separation from uWS the mixture of $Ca(OH)_2$ and metal hydroxides and polysaccharide material with adsorbed toxic metals are in whole or in part disposed as a waste (FIG. 1, 3), to keep in balance the inputs and outputs of calcium containing base and polysaccharide adsorbent throughout the series of batches.

Figure 9A:
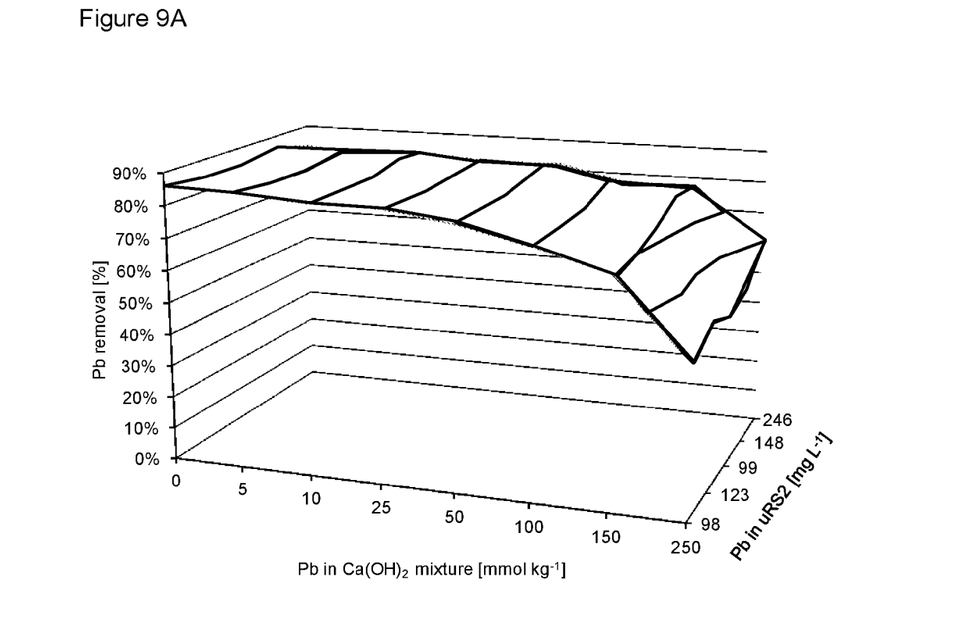
FIGS. 9A and 9B. Removal of Pb from the used washing (uWS) solution (FIG. 9B) and second rinsing (uRS2) solution (FIG. 9A) after alkalinisation with $Ca(OH)_2$ mixtures and with fresh $Ca(OH)_2$. Used process waters and $Ca(OH)_2$ mixtures with different Pb concentration were tested.
Figure 9B:
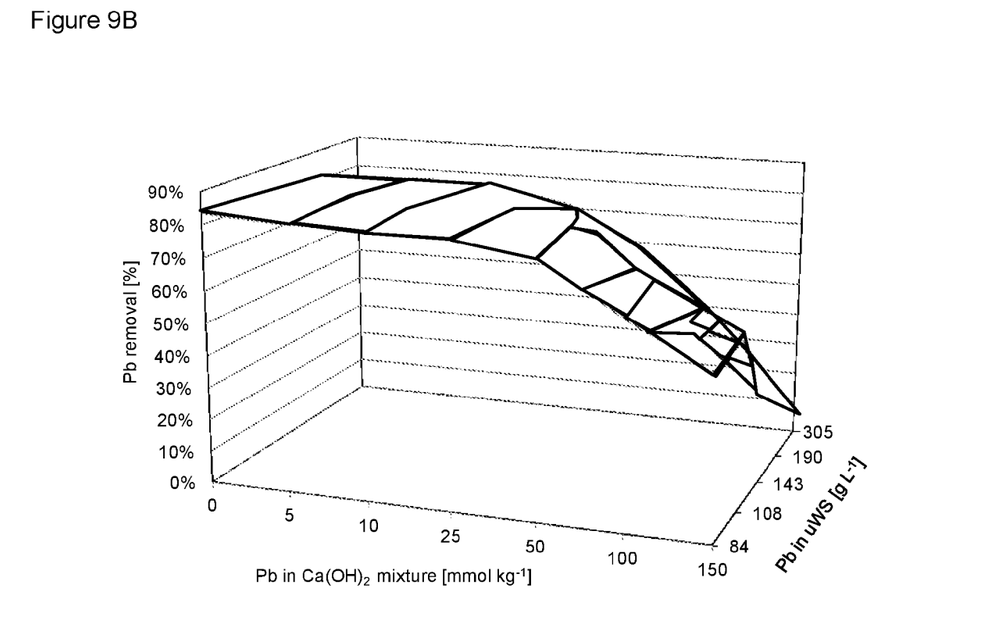

Chelating agents (and soil organic mater dissolved in process solutions, e.g. in uWS) have substantial pH buffering capacity (FIG. 2). In addition to re-used $Ca(OH)_2$ the fresh Ca containing base (i.e. $Ca(OH)_2$, CaO, lime, quicklime or mixture of thereof) and other bases can be used to support alkalinisation of used process solutions with higher concentration of chelating agent (i.e. uRS2 and uWS). Mixtures of used $Ca(OH)_2$ with high concentration of toxic metal hydroxides still has potential to remove toxic metal from process solutions (FIG. 9). Separated in previous batches they can be also used to support alkalinisation.

Formulation and Deposition of Remediated Soil

Figure 10:
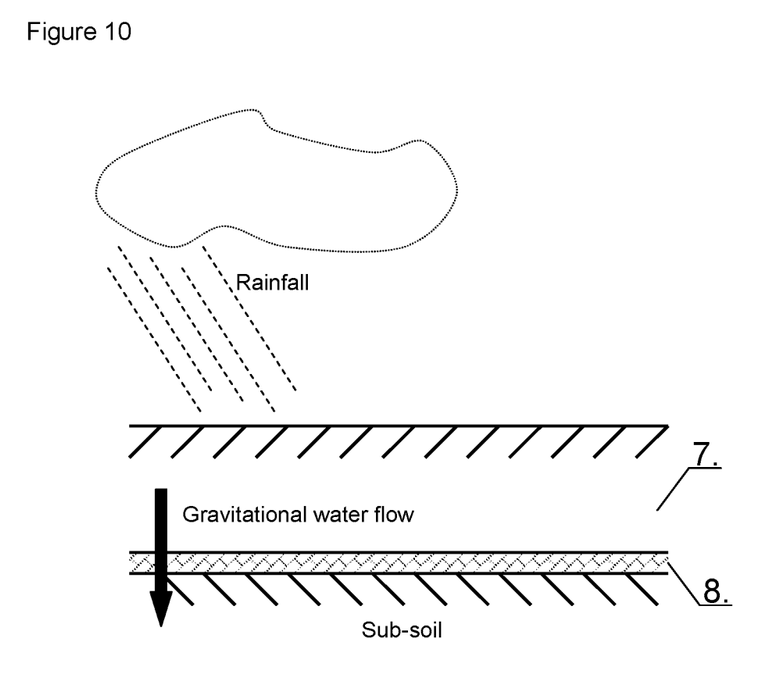
FIG. 10. Deposition of remediated soil/sediment on permeable horizontal reactive to prevent toxic metals leaching and emissions.
Figure 11:
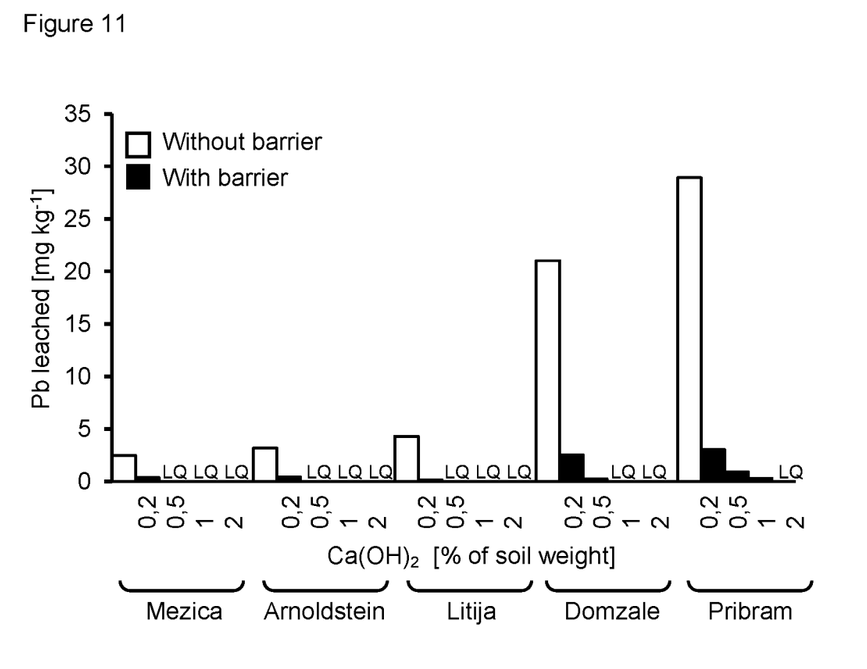
FIG. 11. Leaching of Pb from remediated soils from former Pb smelter sites in Mezica, Litija, Domzale in Slovenia, Arnoldstein in Austria and Pribram in Czech Republic after simulated rainfall. Remediated soils were placed into soil columns with and without installed permeable horizontal reactive barriers. Barriers were constructed in the bottom of soil columns by mixing fresh $Ca(OH)_2$ with remediated soil (weight ratio 1:10). The amounts of $Ca(OH)_2$ tested were 0.2, 0.5, 1.0 and 2.0% of the weight of remediated soil in the column.

The washed and rinsed solid phase can be amended with additives selected from the group consisting of soil fertilizers, soil conditioners, toxic metals immobilizators and microbial inoculants (FIG. 1, 6). Such formulated solid phase constitutes the remediated soil/sediment which is deposited in the site of excavation or elsewhere. To prevent emission of chelated toxic metals which could remain in minute amounts in the washed and rinsed solid phase, the remediated soil/sediment (FIG. 10, 7) is placed on permeable horizontal reactive barrier (FIG. 10, 8). In the preferred embodiment the permeable horizontal reactive barrier is composed of a layer of Ca-containing base as a reactive material in soil or other carrying material. In the conditions of high pH within the said barrier Ca releases toxic metals from chelate and leaves toxic metal hydroxides immobilised within the barrier. The quantity of Ca-containing base used in permeable horizontal reactive barrier is from 0.1 to 2% of the dry weight of remediated soil/sediment. Polysaccharide materials can be used as an auxiliary reactive material for alkaline adsorption of toxic metals and as a carrying material for Ca-containing base. In another embodiment of the said barrier the layer of Ca-containing base is followed by the layer Fe and Al oxides or anion exchange resins in acidic carrying material, i.e. peat, for adsorption of chelating agent. In another embodiment the Ca-containing base and supporting adsorbents can be embedded into the porous media, i.e. textiles, natural and artificial fibres. Permeable reactive barrier can be installed permanently or be removed and reactive material disposed after cessation of the toxic metal emissions. The efficiency of permeable horizontal reactive barrier composed of a layer of $Ca(OH)_2$ in soil as a carrying material is shown in FIG. 11 for remediated soil from various contaminated sites.

The End of the Process According to the Invention

The end of the process according to the invention is characterised by the remediated soil/sediment being returned to the original site, safely deposited elsewhere or used otherwise.

Waste Materials

Mixture of $Ca(OH)_2$ and toxic metal hydroxides and polysaccharide material with adsorbed toxic metals from the alkaline part of the process described in the invention represent waste material of the process. $Ca(OH)_2$ material can be reused as a secondary raw material in the metallurgical industry. Adsorbed toxic metals with economic value can be recovered after separation and combustion of polysaccharide material. Alternatively, the waste material can disposed as a hazardous waste or stabilized using hydraulic binders, thermoplasts (e.g., bitumen) and other means known to one skilled in the art and safely disposed of as non-hazardous solidified monolithic elements.

The invention claimed is:

1. A batch process for remediation of soils/sediments contaminated with toxic metals selected from the group consisting of Pb, Zn, Cd, Cu, Hg, Ni, Mo, Tl, Cr, U, Cs and Sr, in a series of batch processes, said batch process comprising:
   (a) washing or leaching a solid phase of contaminated soil/sediment with washing solution, said washing solution comprising EDTA or other chelating agent from the group of aminopolycarboxylic acids and their salts and mixtures of thereof;
   (b) separating the washing solution from the solid phase to obtain a washed solid phase and used washing solution;
   (c) rinsing of the washed solid phase with one or several rinsing solutions;
   (d) subsequent separation of said rinsing solutions to obtain a rinsed solid phase and one or several used rinsing solutions;
   (e) alkalinisation of the used washing solution and used rinsing solutions obtained in steps (b) and (d), respectively, to value between pH 11.5 and pH 13.5 using calcium containing base, thereby precipitating mixture comprising used $Ca(OH)_2$ and toxic metal hydroxides;

(f) subsequent supplementation of polysaccharide material to the used washing solution and used rinsing solutions treated in step (e) for alkaline adsorption of toxic metals;

(g) subsequent separation of (i) the precipitated mixture of used $Ca(OH)_2$ and metal hydroxides, and (ii) polysaccharide material with adsorbed toxic metals from the used washing and rinsing solutions; and (h) re-using of the rinsing solution separated in step (g) for rinsing the solid phase in the subsequent batch process in said series of batch processes.

2. The batch process of claim 1, further comprising the steps:

(i) acidification of the separated used rinsing solutions of step (g) containing chelating agent to the value between pH 3.0 and pH 1.5 using $H_2SO_4$, thereby precipitating the chelating agent; and (j) subsequent separation of the precipitated chelating agent from rinsing solutions of step (i).

3. The batch process of claim 1, further comprising the steps:

(k) addition of the chelating agent separated in step (j) and of fresh chelating agent to the used washing solution of the step (g), thereby recycling the washing solution with chelating agent concentration between 10 and 250 mol per ton of soil/sediment processed and with pH value between 3.0 and 9.0 to be used in step (a) of the subsequent batch process in said series of batch processes; and (l) formulation of the rinsed solid phase of the step (c) by at least one additive selected from the group consisting of soil fertilizers, soil conditioners, toxic metals immobilizators and microbial inoculants to obtain the remediated soil/sediment.

4. The batch process of claim 1, wherein the volume of fresh water for final rinsing of the washed solid phase in step (c) is defined by the difference in water content in the rinsed solid phase and in the contaminated soil/sediment and by other water losses during the process.

5. The batch process of claim 1, wherein the used rinsing solution which is last separated from the solid phase in step (d) can be directly without further treatment used as a first rinsing solution in step (c) of the succeeding batch in a series of batch processes.

6. The batch process of claim 1, wherein of the group of used rinsing solutions treated in steps (e) and (f), the used rinsing solution last separated from the solid phase in step (d) is alkalinised with 0.1 to 30 kg $m^{-3}$ of fresh Ca containing base and treated with 0.2 to 10 kg $m^{-3}$ of fresh polysaccharide material for alkaline adsorption of toxic metals.

7. The batch process of claim 1, wherein the mixture of used $Ca(OH)_2$ and toxic metal hydroxides and the used polysaccharide material with adsorbed toxic metals separated from the given process solution in step (g) are re-used in alkalinisation step (e) and alkaline adsorption step (f) of the process solution which is series of batch processes in step (d) separated from the solid phase before the given process solution.

8. The batch process of claim 1, wherein the mixture of said used $Ca(OH)_2$ and toxic metal hydroxides precipitated in step (e) can be supplemented with fresh calcium, sodium or potassium containing base and with used $Ca(OH)_2$ and toxic metal hydroxides from previous batches.

9. The batch process of claim 1, wherein the mixture of used $Ca(OH)_2$ and toxic metal hydroxides and the used polysaccharide material with adsorbed toxic metals which are separated from the used washing solution in step (g) are in whole or in part removed from the process to ensure balance of inputs and outputs of calcium containing base and polysaccharide adsorbent throughout the series of batches.

10. The batch process of claim 1, further comprising the step:

(m) deposition of the washed solid phase as remediated soil/sediment on a permeable horizontal reactive barrier.

11. The batch process of claim 10, wherein in the remediated soil/sediment deposition step (m) the permeable horizontal reactive barrier contains calcium-containing base as a reactive material and adsorbents selected from polysaccharides, aluminium and iron oxides and anion exchange resins as auxiliary reactive materials.

12. The batch process of claim 5, wherein the mixture of said used $Ca(OH)_2$ and toxic metal hydroxides precipitated in step (e) can be supplemented with fresh calcium, sodium or potassium containing base and with used $Ca(OH)_2$ and toxic metal hydroxides from previous batches.

* * * * *